United States Patent
Subramanian (10) Patent No.: US 12,304,267 B2
(45) Date of Patent: May 20, 2025

(54) SYSTEM AND METHOD FOR TIRE CONTACT PATCH OPTIMIZATION

(71) Applicant: VOLVO TRUCK CORPORATION, Gothenburg (SE)

(72) Inventor: Chidambaram Subramanian, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 118 days.

(21) Appl. No.: 18/044,851

(22) PCT Filed: Nov. 23, 2020

(86) PCT No.: PCT/US2020/061817
§ 371 (c)(1),
(2) Date: Mar. 10, 2023

(87) PCT Pub. No.: WO2022/108603
PCT Pub. Date: May 27, 2022

(65) Prior Publication Data
US 2023/0356556 A1 Nov. 9, 2023

(51) Int. Cl.
B60C 23/00 (2006.01)
B60C 99/00 (2006.01)
B60G 17/0165 (2006.01)
B60G 17/0195 (2006.01)
B60G 17/052 (2006.01)
B60C 19/00 (2006.01)

(52) U.S. Cl.
CPC ........ B60G 17/0195 (2013.01); B60C 23/002 (2013.01); B60C 99/006 (2013.01);
(Continued)

(58) Field of Classification Search
CPC ........... B60C 23/002; B60C 2019/004; B60C 99/006; B60G 17/0165; B60G 17/0195;
(Continued)

(56) References Cited

U.S. PATENT DOCUMENTS

2010/0271191 A1* 10/2010 De Graff ............. B60C 23/0493
73/146
2015/0005982 A1 1/2015 Muthukumar
(Continued)

FOREIGN PATENT DOCUMENTS

EP 2774784 A1 9/2014
EP 2777956 A2 9/2014
(Continued)

OTHER PUBLICATIONS

European Communication pursuant to Article 94(3) dated Jun. 5, 2024 in corresponding European Patent Application No. 20828184.0, 7 pages.
(Continued)

*Primary Examiner* — Erick R Solis
(74) *Attorney, Agent, or Firm* — Venable LLP; Jeffri A. Kaminski (57) ABSTRACT

Systems, methods, and computer-readable storage media for using multi-stage machine learning algorithms to optimize tire contact patches on a vehicle. Vehicle sensors first collect vehicle information for the vehicle, and input that data into a first machine learning algorithm. The first machine learning algorithm then outputs a lateral dimension, a longitudinal dimension, and a diagonal dimension, which together identify a tire contact patch of at least one tire on the vehicle. The operator of the vehicle provides a human preference for how the vehicle operates, and a second machine learning algorithm is executed. The second machine learning algorithm inputs can include the plurality of vehicle information, the first machine learning algorithm outputs, and the human preference, and the second machine learning algorithm outputs can include a desired tire pressure of the at least one tire and an air suspension adjustment for the normal load of the vehicle.

20 Claims, 4 Drawing Sheets

(52) U.S. Cl.
CPC ....... *B60G 17/0165* (2013.01); *B60G 17/052* (2013.01); *B60C 2019/004* (2013.01); *B60G 2400/204* (2013.01); *B60G 2400/52* (2013.01); *B60G 2400/82* (2013.01); *B60G 2500/201* (2013.01)

(58) Field of Classification Search
CPC .............. B60G 17/052; B60G 2400/52; B60G 2400/82; B60G 2400/204; B60G 2500/201
USPC .......................................................... 701/40
See application file for complete search history.

(56) References Cited

U.S. PATENT DOCUMENTS

| | | | |
|---|---|---|---|
| 2016/0129737 A1 | 5/2016 | Singh et al. | |
| 2018/0222259 A1 | 8/2018 | Janik | |
| 2021/0061027 A1* | 3/2021 | Da Deppo | ............ B60C 23/041 |
| 2021/0107324 A1* | 4/2021 | Kalyanaraman | ........ B60C 23/06 |

FOREIGN PATENT DOCUMENTS

| | | |
|---|---|---|
| WO | 2019122218 A1 | 6/2019 |
| WO | 2020119004 A1 | 6/2020 |
| WO | 2020119956 A1 | 6/2020 |

OTHER PUBLICATIONS

International Search Report and Written Opinion of the International Searching Authority in corresponding International Application No. PCT/US2020/061817 mailed Feb. 4, 2021 (10 pages).

European Communication under Rule 71(3) EPC dated Mar. 20, 2025 in corresponding European Patent Application No. 20828184.0, 34 pages.

* cited by examiner

SYSTEM AND METHOD FOR TIRE CONTACT PATCH OPTIMIZATION

CROSS-REFERENCE TO RELATED APPLICATIONS

This application is a U.S. National Stage application of PCT/US2020/061817, filed Nov. 23, 2020 and published on Mar. 27, 2022, as WO 2022/108603, all of which is hereby incorporated by reference in its entirety.

BACKGROUND

1. Technical Field

The present disclosure relates to tire contact patch optimization, and more specifically to using a multi-phase machine learning process to determine the optimum tire contact patch for a given circumstance.

2. Introduction

A tire contact patch is the portion of a vehicle's tire which actually contacts the ground or a road surface. The tire contact patch can be adjusted by modifying the tire's pressure, tire alignment, camber of the tires, and other factors, all of which affect the wear on the tire, the tire's friction against the ground (needed for both braking and acceleration), and comfort, performance, and/or fuel economy of the vehicle. However, often the tire contact patches are not optimized for the driver's preferences or for the current driving conditions.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a processor from a plurality of sensors, a plurality of vehicle information associated with a vehicle, the plurality of vehicle information comprising: a vehicle velocity; at least one tire pressure; a normal load; a road surface; and an inertial movement unit at a center of gravity of the vehicle; executing, via the processor, a first machine learning algorithm, wherein: first machine learning algorithm inputs comprise the plurality of vehicle information; and first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle; receiving, at the processor, a human preference for how the vehicle operates; and executing, via the processor, a second machine learning algorithm, wherein: second machine learning algorithm inputs comprise the plurality of vehicle information, the first machine learning algorithm outputs, and the human preference; and second machine learning algorithm outputs comprise a desired tire pressure of the at least one tire and an air suspension adjustment for the normal load of the vehicle.

A vehicle configured to perform the concepts disclosed herein can include: a plurality of sensors; a processor; and a non-transitory computer-readable storage medium having instructions stored which, when executed by the processor, cause the processor to perform operations comprising: receiving, from the plurality of sensors, a plurality of vehicle information associated with the vehicle, the plurality of vehicle information comprising: a vehicle velocity; at least one tire pressure; a normal load; a road surface; and an inertial movement unit at a center of gravity of the vehicle; executing a first machine learning algorithm, wherein: first machine learning algorithm inputs comprise the plurality of vehicle information; and first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle; receiving a human preference for how the vehicle operates; and executing a second machine learning algorithm, wherein: second machine learning algorithm inputs comprise the plurality of vehicle information, the first machine learning algorithm outputs, and the human preference; and second machine learning algorithm outputs comprise a desired tire pressure of the at least one tire and an air suspension adjustment for the normal load of the vehicle.

A non-transitory computer-readable storage medium configured as disclosed herein can have instructions stored which, when executed by a computing device, cause the computing device to perform operations which include: receiving, from a plurality of sensors, a plurality of vehicle information associated with a vehicle, the plurality of vehicle information comprising: a vehicle velocity; at least one tire pressure; a normal load; a road surface; and an inertial movement unit at a center of gravity of the vehicle; executing a first machine learning algorithm, wherein: first machine learning algorithm inputs comprise the plurality of vehicle information; and first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle; receiving a human preference for how the vehicle operates; and executing a second machine learning algorithm, wherein: second machine learning algorithm inputs comprise the plurality of vehicle information, the first machine learning algorithm outputs, and the human preference; and second machine learning algorithm outputs comprise a desired tire pressure of the at least one tire and an air suspension adjustment for the normal load of the vehicle.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

One exemplary, non-limiting, practical application to the technical problem noted above is using multiple machine learning algorithms, in series, to determine (using a first machine learning algorithm) an optimum tire contact patch for current driving conditions and driver preferences, then determine (using a second machine learning algorithm) how to modify vehicle parameters to obtain that optimization. Each respective algorithm executed by a processor or other computing device is based on a distinct machine learning model, where the machine learning models have been converted to executable code.

Consider the following example. As a vehicle is driving down the road, sensors within the vehicle collect information about the vehicle. For example, the vehicle sensors can collect the vehicle velocity, tire pressure(s), road surface type over which the vehicle is currently traversing, a normal load for the vehicle, current steering input, and Inertial Movement Unit (IMU) at the Center of Gravity (CG) for the vehicle. Other exemplary data which can be collected could include slip data for the various wheels, braking capacity, angle of ascent/descent, general engine data, road conditions (wet, dry, icy, etc.), and/or any other data conveyed via the Controller Area Network (CAN) bus within a vehicle.

The collected vehicle information can be input into a first machine learning algorithm executed by a processor within the vehicle. The output of the first machine learning algorithm is the current tire contact patch for one or more of the tires of the vehicle, output as three values: a "X" value defining the horizontal/lateral dimension, across the tread of the tire, where the tire is contacting the surface; a "Y" value identifying the vertical/longitudinal dimension, following the tread of the tire," where the tire is contacting the surface; and a "Z" value defining a diagonal dimension across the tire contact patch. If the tire contact patch is a rectangle, with the width and height corresponding to the X and Y values, then the Z is the diagonal dimension of that rectangle. If the tire contact patch is an oval, the diagonal value Z may represent the furthest dimension within the tire contact patch which crosses both the X and Y axes.

The X, Y, and Z values defining the vehicle's current tire contact patch are then used as inputs to a second machine learning algorithm. Additional inputs to the second machine learning algorithm can also include the vehicle information which were used as inputs to the first machine learning algorithm, as well as a driver (or other human being) preference on how the vehicle should be optimized. For example, the driver could indicate that they desire that tire contact patches of the vehicle be configured to optimize the fuel economy of the vehicle. Other examples of driver preferences could be that the tire contact patches minimize the wear on the tires (thereby optimizing tire wear), optimizing ride comfort, or optimizing vehicle performance for a given scenario (such as optimizing for cornering versus optimizing for lack of cornering). While in this example the system is configured to take a single driver preference, in other configurations the inputs to the second machine learning algorithm can also include multiple driver preferences, or ranked driver preferences.

The second machine learning algorithm then outputs optimal vehicle configuration values (such as the optimal tire pressure) based on the inputs provided to the algorithm, as well as signals indicating how to adjust aspects of the vehicle to reach those optimal vehicle configuration values.

For example, the second machine learning algorithm may output an optimal tire pressure based on the inputs provided to the algorithm, as well as a normal load adjustment using air suspension. In another instance, the second machine learning algorithm may output an optimal tire pressure, as well as an adjustment value regarding the tire pressure in a single tire. In yet another instance, the second machine learning algorithm may output the optimal tire pressure, an adjustment value regarding the optimal tire pressure, and an adjustment to the vehicle's shocks.

In some configurations, where the vehicle is not configured to auto-adjust while operating, the outputs of the second machine learning algorithm can be presented to the driver or to a technician, who can then make manual adjustments to the vehicle at their judgment. Such output can, for example, be displayed on the vehicle dashboard, via a smartphone application, or by any other effective vehicle-to-human communication mechanism.

In configurations where the vehicle is configured to auto-adjust while operating, the outputs of the second machine learning algorithm can be provided to actuators and other control systems within the vehicle. The actuators can then adjust the vehicle components according to the adjustment values output by the second machine learning algorithm, and sensors can compare the adjusted component values to the optimal/desired component values output by the second machine learning algorithm. For example, an adjustment to the tire pressure can be sent to a Central Tire Inflation System (CTIS), which in turn inflates or deflates the tire according to the adjustment. A tire sensor can then compare the tire pressure, after the adjustment, to the desired tire pressure output by the second machine learning algorithm, identify if a discrepancy exists, and re-adjust if such a discrepancy exists. Likewise, if an adjustment to the air suspension is necessary based on the second machine learning model, the adjustment output can be sent to air suspension actuators, then the adjusted air suspension level can be detected, resulting in additional adjustments if necessary.

As an example of how to train the first machine learning model, a vehicle manufacturer or other entity can collect known information (corresponding to the input information of the first machine learning model, such as the vehicle velocity, tire pressure(s), road surface type over which the vehicle is currently traversing, a normal load for the vehicle, current steering input, and the IMU at the CG for the vehicle) and known tire contact patches. This data can be collected from multiple vehicles under multiple conditions, preferably with the amount of data collected from each vehicle being at least thirty minutes of operation, though the amount of data can vary.

The known data of both the vehicle information and the corresponding, known tire contact patches can be compared via a sensitivity analysis, resulting in correlations between the vehicle information and the corresponding, known tire contact patches. For example, the sensitivity analysis can execute models (such as a one-at a time test, a derivative-based local method, regression analysis, variance-based method, screening, scatter plots, etc.) to identify how a given input/variable affects the likelihood of a specific condition (such as the X, Y, Z dimensions) in the tire contact patch being determined. More specifically, the system can receive the known vehicle information (such as the vehicle velocity, tire pressure(s), road surface type over which the vehicle is currently traversing, a normal load for the vehicle, current steering input, and the IMU at the CG for the vehicle), and determine how they affect the size or shape of the tire contact patch. The correlation outputs of the sensitivity analysis identify the likelihood of a given variable affecting one or more of the tire contact patch dimensions (X, Y, and/or Z).

The outputs of the sensitivity analysis, as well the training data, can then be used by to construct a neural network. For example, the correlations and test data associated with the sensitivity analysis can be input into Python, MatLab®, or other development software configured to construct neural network based on factor-specific data. Depending on the specific scenario, users can adjust the neural network construction by selecting from optimization methods including (but not limited to) the least-squares method, the Levenberg-Marquardt algorithm, the gradient descent method, or the Gauss-Newton method. The neural network can make predictions of the tire contact patch size given input variables corresponding to the same vehicle information which were used to train the neural network. The neural network can then be converted to machine code and uploaded into memory, where upon execution by a processor the neural network operates as the first machine learning algorithm.

The second machine learning model is trained in a similar manner, with performance of a sensitivity analysis on known input variables and known outputs, converting the correlations of the sensitivity analysis into a neural network, and then converting the neural network into machine code to be executed by a processor as the second machine learning algorithm. However, in training the second machine learning model, examples of known inputs can include: (1) the same vehicle information used for the first machine learning model, such as the vehicle velocity, tire pressure(s), road surface type over which the vehicle is currently traversing, a normal load for the vehicle, current steering input, and the IMU at the CG for the vehicle; (2) current tire contact patch dimension values X, Y, and Z; and (3) a user's choice for optimization, such as fuel economy, tire wear, ride comfort, and/or performance. The known outputs of the second machine learning model, which are used in the sensitivity analysis, can be the optimal vehicle configuration values (such as the optimum tire pressure, shock sensitivity, load, etc.) of the vehicle. These inputs and outputs are subjected to a sensitivity analysis, and the resulting correlations are used to construct a second neural network in the same manner as described above with respect to the first neural network. The resulting neural network is then converted to machine code to be executed by a processor.

After training both the first machine learning model and the second machine learning model, converting the models to code/algorithms, and loading the respective algorithms into memory within a vehicle for execution, the algorithms can provide feedback on how to adjust the vehicle to best meet the driver's preferences. The sensor data is collected and input into the processor, such that the processor is iterating new values of the current tire contact patch from the first machine learning algorithm. The outputs of the first machine learning algorithm (the X, Y, and Z dimensions), the same collected sensor data (or a subset thereof), and the user's desired optimization are then fed into the second machine learning algorithm, which outputs vehicle configuration values (such as the optimal tire pressure), as well as signals indicating how to adjust aspects of the vehicle to reach those optimal vehicle configuration values. The outputs of the second machine learning algorithm can then be displayed or communicated to the driver (or other human being), or transmitted to actuators within the vehicle which can automatically initiate the vehicle configuration changes identified by the second machine learning algorithm. Sensors can then verify if the changes are satisfactory, and if not continue to initiate additional changes.

It is noted that a single processor could be executing both the first machine learning algorithm and the second machine learning algorithm, or distinct processors could be executing each respective algorithm. Furthermore, while the examples provided illustrate the first and second machine learning algorithms running sequentially, with the second machine learning algorithm receiving data from the first machine learning algorithm, in practice the processor(s) may execute both algorithms in parallel/simultaneously, such that the data processed by the first machine learning algorithm is based on the most recent sensor data collected, and the data processed by the second machine learning algorithm is based on the previous iteration/output of the first machine learning algorithm.

Figure 1:
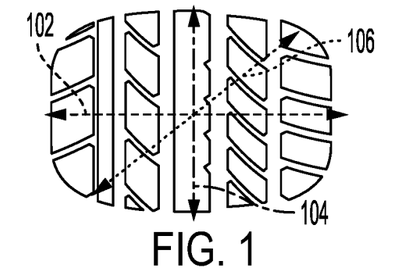
FIG. 1 illustrates an example tire contact patch.

Referring now to the figures, FIG. 1 illustrates an example tire contact patch. This is the portion of the tire contacting the ground or surface upon which a vehicle is resting. The tire contact patch has three variables: the X variable 102, which is the horizontal dimension across (perpendicular to) the tread of the tire; the Y variable 104, which is the vertical dimension illustrated, which runs parallel to the tread of the tire; and the Z variable 106 which is diagonal dimension across the tire contact patch, and which is the furthest dimension within the tire contact patch which crosses both the X and Y axes.

Figure 2:
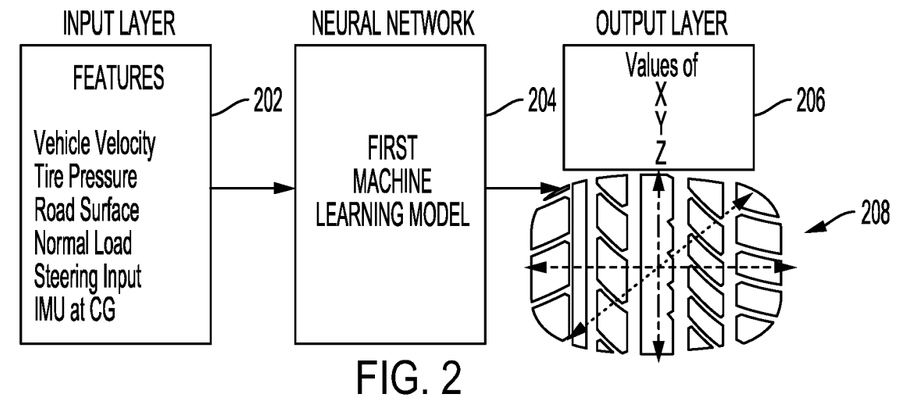
FIG. 2 illustrates an example of a first machine learning model configured to output a tire contact patch.

FIG. 2 illustrates an example of a first machine learning model 204 configured to output the variables for a tire contact patch 208. In this example, a number of vehicle information/features 202 are collected as the vehicle is operating (either in motion or stationary). Exemplary vehicle information/features 202 can include the vehicle velocity, tire pressure(s), road surface type over which the vehicle is currently traversing, a normal load for the vehicle, current steering input, and/or the IMU at the CG for the vehicle. The first machine learning model 204 receives the input, then outputs (at least) three values 206, such as: one or more "X" values defining the horizontal/lateral dimension, across the tread of the tire, where the tire is contacting the surface; one or more "Y" values defining the vertical/longitudinal dimension, following the tread of the tire," where the tire is contacting the surface; and one or more "Z" values defining a diagonal dimension across the tire contact patch 208. The X, Y, and Z 206 values identify the tire contact patch 208, which can be rectangular or oval in shape.

Figure 3:
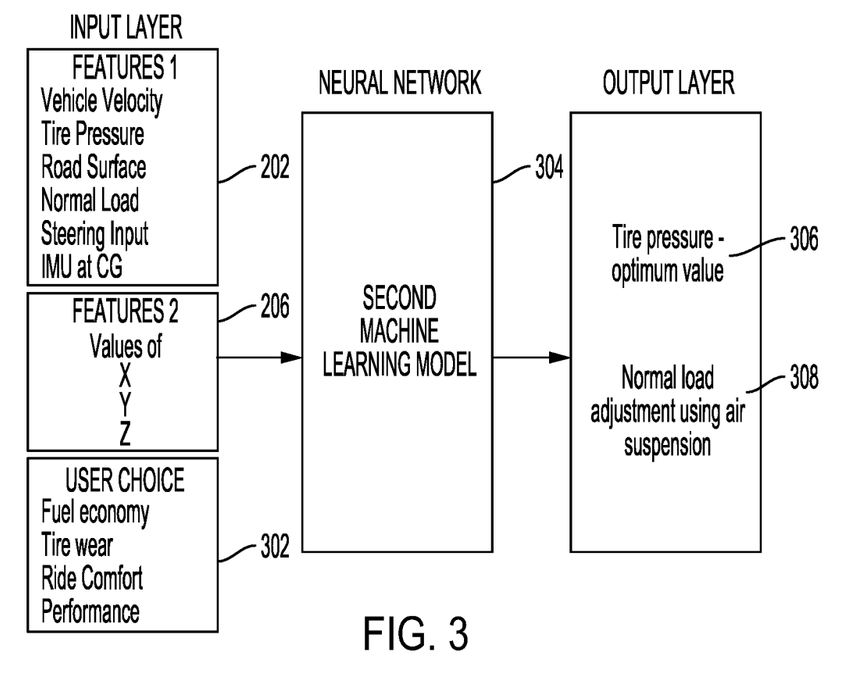
FIG. 3 illustrates an example of a second machine learning model configured to output optimization parameters.

FIG. 3 illustrates an example of a second machine learning model 304 configured to output optimization parameters 306, 308. In this example, inputs to the second machine learning model 304 can include: (1) the same vehicle information/features 202 which were used as inputs to the first machine learning model; (2) the outputs 206, in the form of the X, Y, and Z values, which were output by the first machine learning model; and (3) a user preference 302 or choice, such as an indication from the driver that they wish to maximize the potential fuel economy of the vehicle, minimize the potential wear on the tires, or maximize the comfort of the ride. In some configurations, rather than a single preference from the user, the user can rank preferences. The second machine learning model 304 receives these inputs, then outputs a vehicle configuration parameter 306, vehicle adjustments 308, and/or changes to driver behavior which would best fit the inputs. For example, a vehicle configuration parameter 306 can be the optimal tire pressure for the vehicle tire(s). An example vehicle adjustment 308 could include a normal load adjustment using air suspension. The vehicle adjustment 308 can direct actuators, pumps, or other mechanisms on the vehicle to adjust while the vehicle is in operation. Alternatively, in some configurations the vehicle adjustment 308 can be provided to the driver, maintenance personal, or other vehicle user, to manually make the adjustments 308 to obtain the vehicle configuration parameter 306. In some cases, the second machine learning model 304 can provide suggestions on changes to how the driver controls the vehicle, such as speed suggestions, to manage the optimum tire contact patch.

Figure 4:
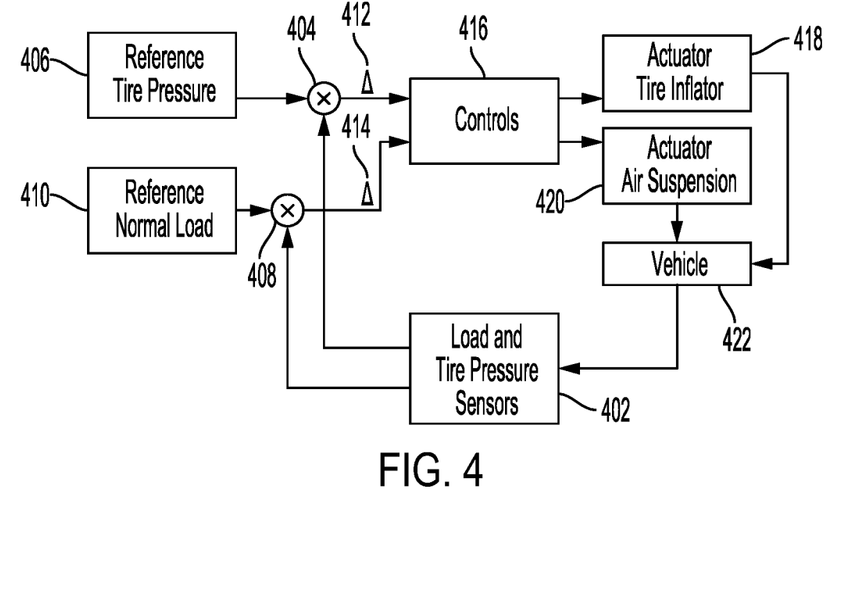
FIG. 4 illustrates an example of a closed feedback loop.

FIG. 4 illustrates an example of a closed feedback loop. In this example, the load and tire pressure sensors 402 are being used to detect current load and tire pressure. The tire pressure is compared 404 against a reference tire pressure 406, and the difference 412 is provided to a control system 416. Likewise, the normal load is compared 408 to a reference normal load 410, with the difference 414 provided to the control system 416. In this example, the reference tire pressure 406 and/or reference normal load can be, for example, outputs from the second machine learning model described in FIG. 3. In other configurations, the reference tire pressure 406 and/or the reference normal load 410 can be standard or previously determined reference values.

The control system 416 receives the differences 412, 414 between the current tire pressure/load output from the sensors 402 and the references 406, 410, then determines to which actuator, pump, or other mechanical means on the vehicle to send adjustment signals. In this case, the control system 416 identifies an actuator tire inflator 418, and sends a signal to the actuator tire inflator 418 to fill, or deflate, a tire based on the difference 412 previously detected. Likewise, the control system 416 identifies an actuator for air suspension 420, and sends a signal to the actuator for air suspension 420 to adjust the vehicle's air suspension based on the difference 414 previously detected. The actuator tire inflator 418 and/or the actuator air suspension 420 make the necessary adjustments, thereby affecting configuration and performance of the vehicle 422.

The load and tire pressure sensors 402 can then detect the updated configuration of the vehicle 422, the control system 416 can detect if differences 412, 414 continue to exist between actual and desired vehicle conditions, and the control system can send the actuators 418, 420 additional control signals if needed. This feedback loop can continue indefinitely, or until a saturation point is reached (that is, until any differences 412, 414 are smaller than a predetermined threshold).

Figure 5:
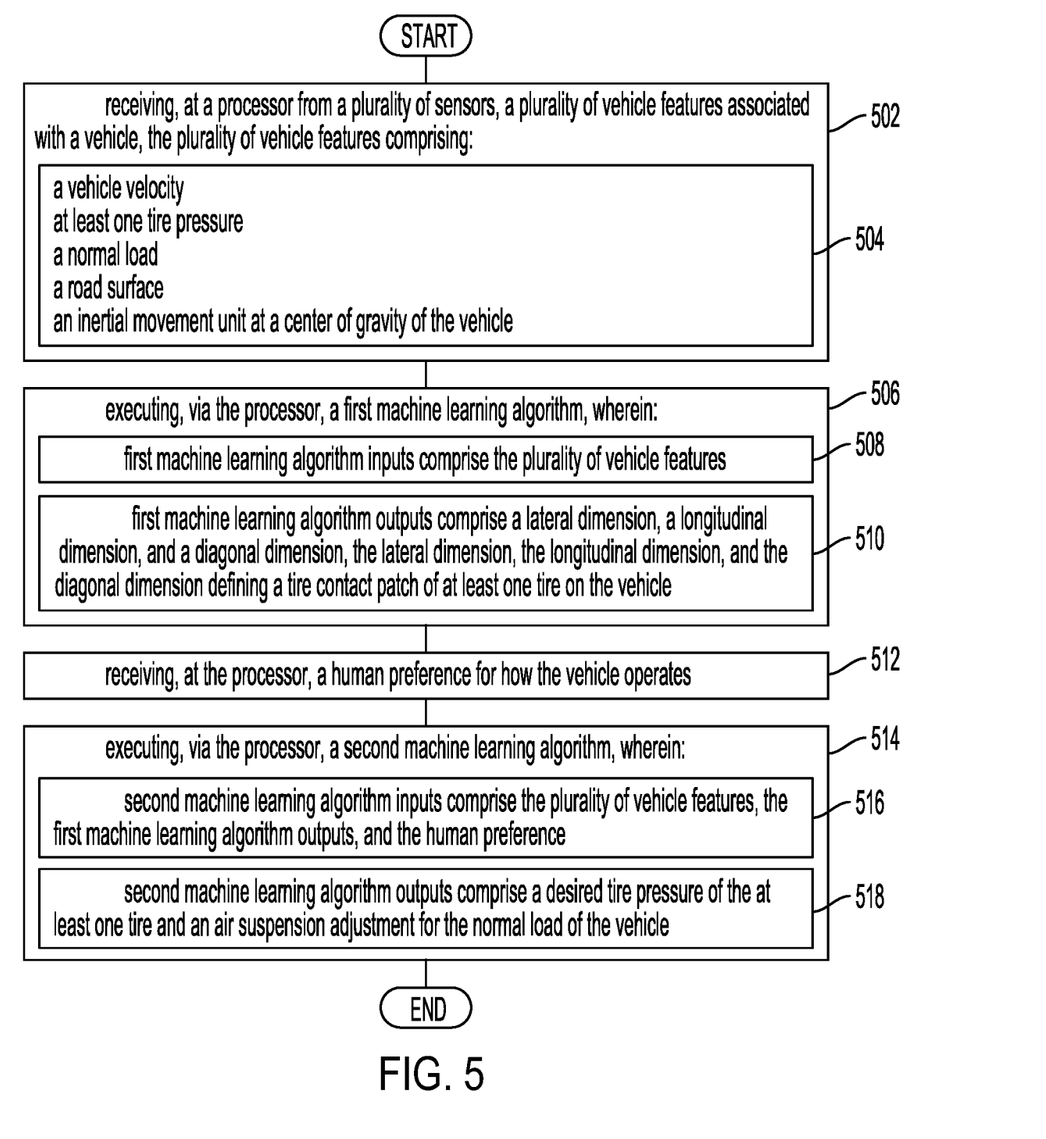
FIG. 5 illustrates an example method embodiment.

FIG. 5 illustrates an example method embodiment being performed by a system (such as a vehicle) which includes a processor. The method includes receiving, at a processor from a plurality of sensors, a plurality of vehicle information/features associated with a vehicle (502). An example (504) of the plurality of vehicle information can include: a vehicle velocity, at least one tire pressure, a normal load, a road surface, and an inertial movement unit at a center of gravity of the vehicle. The system executes, via the processor, a first machine learning algorithm (506) wherein: example first machine learning algorithm inputs comprise the plurality of vehicle information (508); and example first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle (510).

The system receives, at the processor, a human preference for how the vehicle operates (512), and executes, via the processor, a second machine learning algorithm (514). Example second machine learning algorithm inputs can comprise the plurality of vehicle information, the first machine learning algorithm outputs, and the human preference (516), and example second machine learning algorithm outputs can comprise a desired tire pressure of the at least one tire and an air suspension adjustment for the normal load of the vehicle (518).

In some configurations, the illustrated method can be further expanded to include modifying the at least one tire pressure to the desired tire pressure, and modifying air suspension of the vehicle according to the air suspension adjustment. In such cases, the modifying of the at least one tire pressure occurs via a tire pressure actuator, and the modifying of the air suspension occurs via an air suspension actuator.

In another example, the illustrated method can further include: training a first neural network by: generating a first sensitivity analysis for the plurality of vehicle information and known tire contact patches; and forming a first plurality of nodes and a first plurality of neural layers linking the first plurality of nodes based on the first sensitivity analysis, resulting in a first trained neural network; then converting the first trained neural network to executable code, resulting in the first machine learning algorithm. Likewise, the second neural network can be trained by: generating a second sensitivity analysis for the plurality of vehicle information, the first machine learning algorithm outputs, known tire pressures, and known air suspension adjustments for the normal load; and forming a second plurality of nodes and a second plurality of neural layers linking the second plurality of nodes based on the second sensitivity analysis, resulting in a second trained neural network. The second trained neural network can then be converted to executable code, resulting in the second machine learning algorithm.

In some configurations, the human preference can be at least one of: maximum fuel economy; minimize tire wear; maximum ride comfort; and maximum performance.

In some configurations, both the first machine learning algorithm and the second machine learning algorithm identify multi-dimensional boundary conditions associated with respective outputs. For example, the neural networks used to generate the first machine learning algorithm and the second machine learning algorithm can identify boundaries with a number of dimensions equal to the number of input variables to each respective model. If, as described above, the inputs to the first machine learning algorithm were: a vehicle velocity, at least one tire pressure, a normal load, a road surface, and an inertial movement unit at a center of gravity of the vehicle, then the number of dimensions "n" used to describe boundaries for different X, Y, and Z dimensions for the tire contact patch, would be six. In such an instance, the first machine learning algorithm would take the six inputs and identify the X, Y, and Z outputs using the six-dimensional boundary condition. Likewise, in the second machine learning algorithm, the number of dimensions could be thirteen: the six inputs which are identical to the first machine learning algorithm; the X, Y, and Z dimensions for the tire contact patch; and one of maximum fuel economy, minimize tire wear, maximum ride comfort, or maximum performance. To be clear, this is exemplary only, and different configurations could have more or less boundary dimensions for both algorithms.

Figure 6:
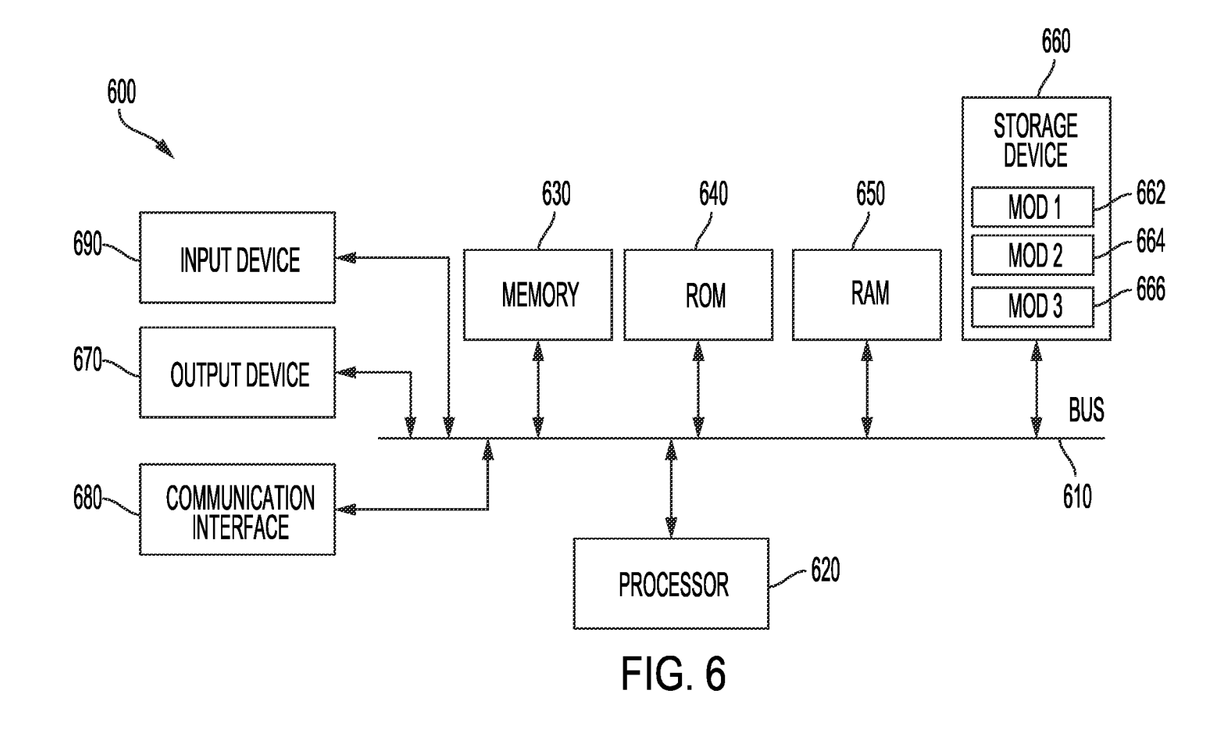
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620.

The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:
1. A method, comprising:
   receiving, at a processor from a plurality of sensors, a plurality of vehicle information associated with a vehicle, the plurality of vehicle information comprising:
      a vehicle velocity;
      at least one tire pressure;
      a normal load;
      a road surface; and
      an inertial movement unit at a center of gravity of the vehicle;
   executing, via the processor, a first machine learning algorithm, wherein:
      first machine learning algorithm inputs comprise the plurality of vehicle information; and
      first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle;
   receiving, at the processor, a human preference for how the vehicle operates; and
   executing, via the processor, a second machine learning algorithm, wherein:
      second machine learning algorithm inputs comprise the plurality of vehicle information, the first machine learning algorithm outputs, and the human preference; and
      second machine learning algorithm outputs comprise a desired tire pressure of the at least one tire and an air suspension adjustment for the normal load of the vehicle.

2. The method of claim 1, further comprising:
modifying the at least one tire pressure to the desired tire pressure; and
modifying air suspension of the vehicle according to the air suspension adjustment.

3. The method of claim 2, wherein:
the modifying of the at least one tire pressure occurs via a tire pressure actuator; and
the modifying of the air suspension occurs via an air suspension actuator.

4. The method of claim 1, further comprising:
training a first neural network by:
generating a first sensitivity analysis for the plurality of vehicle information and known tire contact patches; and
forming a first plurality of nodes and a first plurality of neural layers linking the first plurality of nodes based on the first sensitivity analysis, resulting in a first trained neural network; and
converting the first trained neural network to executable code, resulting in the first machine learning algorithm.

5. The method of claim 4, further comprising:
training a second neural network by:
generating a second sensitivity analysis for the plurality of vehicle information, the first machine learning algorithm outputs, known tire pressures, and known air suspension adjustments for the normal load; and
forming a second plurality of nodes and a second plurality of neural layers linking the second plurality of nodes based on the second sensitivity analysis, resulting in a second trained neural network; and
converting the second trained neural network to executable code, resulting in the second machine learning algorithm.

6. The method of claim 1, wherein the human preference comprises at least one of:
maximum fuel economy;
minimize tire wear;
maximum ride comfort; and
maximum performance.

7. The method of claim 1, wherein both the first machine learning algorithm and the second machine learning algorithm identify multi-dimensional boundary conditions associated with respective outputs.

8. A vehicle comprising:
a plurality of sensors;
a processor; and
a non-transitory computer-readable storage medium having instructions stored which, when executed by the processor, cause the processor to perform operations comprising:
receiving, from the plurality of sensors, a plurality of vehicle information associated with the vehicle, the plurality of vehicle information comprising:
a vehicle velocity;
at least one tire pressure;
a normal load;
a road surface; and
an inertial movement unit at a center of gravity of the vehicle;
executing a first machine learning algorithm, wherein:
first machine learning algorithm inputs comprise the plurality of vehicle information; and
first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle;
receiving a human preference for how the vehicle operates; and
executing a second machine learning algorithm, wherein:
second machine learning algorithm inputs comprise the plurality of vehicle information, the first machine learning algorithm outputs, and the human preference; and
second machine learning algorithm outputs comprise a desired tire pressure of the at least one tire and an air suspension adjustment for the normal load of the vehicle.

9. The vehicle of claim 8, the non-transitory computer-readable storage medium having additional instructions stored which, when executed by the processor, cause the processor to perform operations comprising:
modifying the at least one tire pressure to the desired tire pressure; and
modifying air suspension of the vehicle according to the air suspension adjustment.

10. The vehicle of claim 9, wherein:
the modifying of the at least one tire pressure occurs via a tire pressure actuator; and
the modifying of the air suspension occurs via an air suspension actuator.

11. The vehicle of claim 8, the non-transitory computer-readable storage medium having additional instructions stored which, when executed by the processor, cause the processor to perform operations comprising:
training a first neural network by:
generating a first sensitivity analysis for the plurality of vehicle information and known tire contact patches; and
forming a first plurality of nodes and a first plurality of neural layers linking the first plurality of nodes based on the first sensitivity analysis, resulting in a first trained neural network; and
converting the first trained neural network to executable code, resulting in the first machine learning algorithm.

12. The vehicle of claim 11, the non-transitory computer-readable storage medium having additional instructions stored which, when executed by the processor, cause the processor to perform operations comprising:
training a second neural network by:
generating a second sensitivity analysis for the plurality of vehicle information, the first machine learning algorithm outputs, known tire pressures, and known air suspension adjustments for the normal load;
forming a second plurality of nodes and a second plurality of neural layers linking the second plurality of nodes based on the second sensitivity analysis, resulting in a second trained neural network; and
converting the second trained neural network to executable code, resulting in the second machine learning algorithm.

13. The vehicle of claim 8, wherein the human preference comprises at least one of:
maximum fuel economy;
minimize tire wear;
maximum ride comfort; and
maximum performance.

14. The vehicle of claim 8, wherein both the first machine learning algorithm and the second machine learning algorithm identify multi-dimensional boundary conditions associated with respective outputs.

15. A non-transitory computer-readable storage medium having instructions stored which, when executed by a processor, cause the processor to perform operations comprising:
receiving, from a plurality of sensors, a plurality of vehicle information associated with a vehicle, the plurality of vehicle information comprising:
a vehicle velocity;
at least one tire pressure;
a normal load;
a road surface; and
an inertial movement unit at a center of gravity of the vehicle;
executing a first machine learning algorithm, wherein:
first machine learning algorithm inputs comprise the plurality of vehicle information; and
first machine learning algorithm outputs comprise a lateral dimension, a longitudinal dimension, and a diagonal dimension, the lateral dimension, the longitudinal dimension, and the diagonal dimension defining a tire contact patch of at least one tire on the vehicle;
receiving a human preference for how the vehicle operates; and
executing a second machine learning algorithm, wherein:
second machine learning algorithm inputs comprise the plurality of vehicle information, the first machine learning algorithm outputs, and the human preference; and
second machine learning algorithm outputs comprise a desired tire pressure of the at least one tire and an air suspension adjustment for the normal load of the vehicle.

16. The non-transitory computer-readable storage medium of claim 15, having additional instructions stored which, when executed by the processor, cause the processor to perform operations comprising:
modifying the at least one tire pressure to the desired tire pressure; and
modifying air suspension of the vehicle according to the air suspension adjustment.

17. The non-transitory computer-readable storage medium of claim 16, wherein:
the modifying of the at least one tire pressure occurs via a tire pressure actuator; and
the modifying of the air suspension occurs via an air suspension actuator.

18. The non-transitory computer-readable storage medium of claim 15, having additional instructions stored which, when executed by the processor, cause the processor to perform operations comprising:
training a first neural network by:
generating a first sensitivity analysis for the plurality of vehicle information and known tire contact patches; and
forming a first plurality of nodes and a first plurality of neural layers linking the first plurality of nodes based on the first sensitivity analysis, resulting in a first trained neural network; and
converting the first trained neural network to executable code, resulting in the first machine learning algorithm.

19. The non-transitory computer-readable storage medium of claim 18, having additional instructions stored which, when executed by the processor, cause the processor to perform operations comprising:
training a second neural network by:
generating a second sensitivity analysis for the plurality of vehicle information, the first machine learning algorithm outputs, known tire pressures, and known air suspension adjustments for the normal load;
forming a second plurality of nodes and a second plurality of neural layers linking the second plurality of nodes based on the second sensitivity analysis, resulting in a second trained neural network; and
converting the second trained neural network to executable code, resulting in the second machine learning algorithm.

20. The non-transitory computer-readable storage medium of claim 15, wherein the human preference comprises at least one of:
maximum fuel economy;
minimize tire wear;
maximum ride comfort; and
maximum performance.

* * * * *